United States Patent [19]

Stelly

[11] Patent Number: 4,928,418
[45] Date of Patent: May 29, 1990

[54] EXPANDABLE GOOSE DECOY

[76] Inventor: Mark Stelly, 2211 Coryell St., League City, Tex. 77573

[21] Appl. No.: 353,401

[22] Filed: May 16, 1989

[51] Int. Cl.⁵ .......................................... A01M 31/06
[52] U.S. Cl. .......................................................... 43/3
[58] Field of Search ............................ 43/2, 3; 46/157; 224/123, 153; 223/66

[56] References Cited

U.S. PATENT DOCUMENTS

| | | |
|---|---|---|
| D. 185,866 | 8/1959 | Anderson ................ D31/4 |
| D. 229,177 | 11/1973 | Schwartzirauber ................ D22/5 |
| 554,368 | 2/1896 | Kunselman . |
| 1,473,612 | 11/1923 | Dewey . |
| 1,603,114 | 10/1926 | Johnson . |
| 2,237,897 | 4/1941 | Vos ................ 46/157 |
| 2,450,572 | 10/1948 | Ballard ................ 43/3 |
| 2,478,585 | 8/1949 | Kouba ................ 43/3 |
| 2,489,271 | 11/1949 | Colgan ................ 43/3 |
| 2,536,338 | 1/1951 | Withey et al. ................ 43/3 |
| 2,662,327 | 12/1953 | Petersen ................ 43/3 |
| 2,723,480 | 11/1955 | Candy ................ 43/3 |
| 2,746,196 | 5/1956 | Karr ................ 43/3 |
| 2,763,952 | 7/1955 | Bruce ................ 43/3 |
| 2,783,572 | 3/1957 | Rohan ................ 43/3 |
| 2,799,961 | 7/1957 | Jaumotte ................ 43/3 |
| 2,812,608 | 3/1954 | Jones ................ 43/3 |
| 2,885,813 | 5/1959 | Kratzert ................ 43/3 |
| 2,947,104 | 8/1960 | Johnson ................ 43/3 |
| 3,029,541 | 4/1962 | Palmer ................ 43/3 |
| 3,245,168 | 4/1966 | Pool ................ 43/3 |
| 3,404,481 | 10/1968 | Speers ................ 43/3 |
| 3,707,798 | 1/1973 | Tryon ................ 43/3 |
| 3,800,457 | 4/1974 | Barrett ................ 43/3 |
| 3,869,823 | 3/1975 | Powers et al. ................ 43/3 |
| 4,062,141 | 12/1977 | Shjeflo ................ 43/3 |
| 4,172,335 | 10/1979 | Farmer ................ 43/3 |
| 4,251,937 | 2/1981 | Curley ................ 43/3 |
| 4,318,240 | 3/1982 | Hillesland ................ 43/3 |
| 4,334,643 | 6/1982 | Farmer ................ 224/123 |
| 4,450,642 | 5/1984 | DeKezel et al. ................ 43/3 |
| 4,475,674 | 10/1984 | Farmer ................ 224/153 |
| 4,611,421 | 9/1986 | Jacob ................ 43/3 |
| 4,651,457 | 3/1987 | Nelson et al. ................ 43/3 |
| 4,689,913 | 9/1987 | Brice ................ 43/3 |
| 4,691,463 | 9/1987 | DeKezel et al. ................ 43/3 |
| 4,753,028 | 6/1988 | Farmer ................ 43/3 |
| 4,798,317 | 1/1989 | Lonczak ................ 223/66 |

Primary Examiner—Nicholas P. Godici
Assistant Examiner—Mike Starkweather
Attorney, Agent, or Firm—Pravel, Gambrell, Hewitt, Kimball & Krieger

[57] ABSTRACT

An expandable goose decoy having a wire frame and an expandable body envelope. The body envelope is expanded by rotating upon a fully enclosed rigid stationary loop on the wire frame.

12 Claims, 2 Drawing Sheets

EXPANDABLE GOOSE DECOY

SPECIFICATION

1. Field of the Invention

This invention is in the field of decoys used by hunters, particularly in the hunting of geese. The inventive features of this decoy could also be applied to decoys for other species.

2. Background of the Invention

In the hunting of birds such as ducks and geese, it is common practice to use devices called decoys which resemble the bird being hunted. These decoys are usually placed in the vicinity of the blind from which the hunter shoots. In the case of duck hunting, the decoys are generally placed in a body of water. In the case of goose hunting, the decoys will frequently be placed in a field, such as a corn field or rice field, and the hunter may simply lie in the field nearby.

Typically, a large number of decoys will be set out, to achieve the best effect. This frequently requires dozens of decoys. Geese being large birds, and decoys often being oversized for high visibility, a goose decoy can be a very large piece of equipment. Even if the decoy is made of light material, carrying dozens of them can be difficult since they are so bulky if they are not collapsible.

Because of this, many methods have been devised to construct a goose decoy which will collapse to a compact size but which can be deployed easily to a full size. Some such decoys are made of cardboard bodies which can be split outwardly and held open by some type of frame. Such cardboard decoys, of course, are relatively flat sided, giving an unrealistic appearance. This flat appearance is usually compensated for by painting the decoy to create a three dimensional appearance. Some decoys attempt to avoid the flat appearance by bending the cardboard around a framing member or by placing a cloth covering over a complicated frame in the shape of a body. Most existing decoys are not very successful at presenting the soft, contoured appearance of a goose when viewed by airborne geese. This is evidenced by the fact that many hunters believe that an array of large white rags in the field will be more successful than a set of any available collapsible decoys. A plastic wind sock decoy is also available. It requires a wind to be blowing, and rain can cause the decoy to collapse. It would be desirable to devise a decoy which is light, collapsible to a compact size, and effective at presenting a realistic soft, contoured image to flying geese.

SUMMARY OF THE INVENTION

This invention is a collapsible decoy having a flat, rigid wire frame. The frame has a vertical stand including a stationary loop for a head, a loop for carrying and storage, a stabilizing bend to prevent rotation of the decoy in the wind, and a sharp lower end for insertion into the ground. Alternatively, the wire-frame could be mounted on a float for use in water. The frame also has an elliptical body loop rigidly projecting from the vertical part of the frame, with the loop being in the shape of an ellipse having its major axis horizontal and its minor axis vertical. The body of a goose is simulated by an elliptical envelope of closed cell foam folded over the body loop so that the body envelope can rotate about its major axis while the body loop stays stationary.

The body envelope is turned so that it lies flat against the body loop for storage or carrying. When in use, the envelope is turned perpendicular to the body loop to cause the envelope to expand, giving the body some depth, to create the appearance of a live goose. The closed cell foam used to make the body envelope is stiff enough to retain its shape when rotated perpendicular to the body loop, but soft enough to give a lifelike appearance. The same foam material can be used to shape a head for attachment to the head loop on the wire frame.

DETAILED DESCRIPTION OF THE PREFERRED EMBODIMENT

Figure 1:
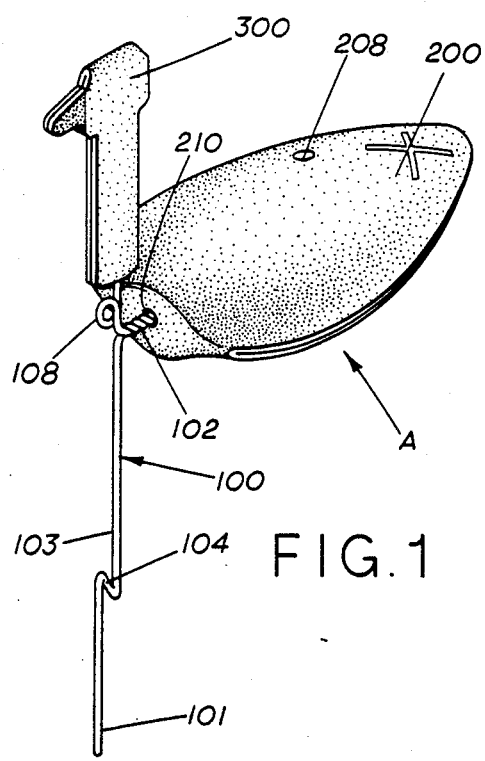
FIG. 1 is a perspective view of the apparatus of the present invention in the use configuration.

As seen in FIG. 1, the decoy apparatus A of the present invention is composed of a substantially vertical wire frame 100, a closed cell polyethylene foam body envelope 200, and a closed cell polyethylene foam head 300. In FIG. 1, the body envelope 200 is rotated perpendicular to the vertical stand 103 of wire frame 100, in the configuration in which the decoy A is used for hunting. The decoy A is held vertical by having the lower end 101 of frame 100 pushed into the ground. Insertion into the ground is desirable to the point where stabilizer bend 104 in frame 100 contacts the ground or is at least partially inserted therein. This prevents decoy A from twisting in the wind.

Figure 2:
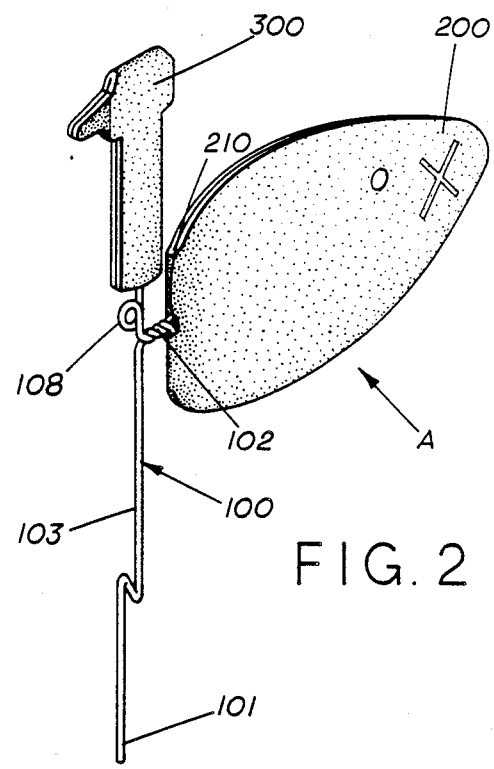
FIG. 2 is a perspective view of the apparatus of FIG. 1 in the storage configuration.

FIG. 2 shows the decoy A in the storage configuration, with body envelope 200 rotated substantially coplanar with the vertical stand 103 of wire frame 100. This gives decoy A a flat, compact shape, easily stacked and stored. Storage loop 108 is provided on wire frame 100 between body connector 102 and head 300. Storage loop 108 can hang on a rack or a rope can be strung through storage loop 108 for stacking.

Figure 3:
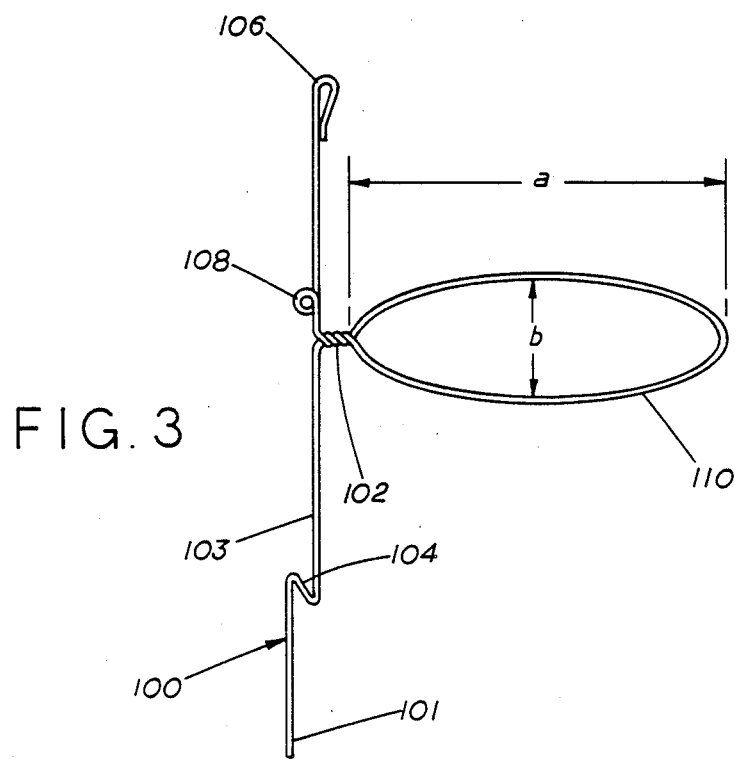
FIG. 3 is a side elevation of the wire frame as used in the present invention.

As seen in FIG. 3, wire frame 100 has a substantially vertical stand 103, at the top of which is head loop 106, and near the lower end 101 is stabilizer bend 104. Approximately midway of the height of stand 103 and perpendicular thereto is body connector 102, to which body loop 110 is attached. At approximately the height of the body connector 102 is storage loop 108 also extending from stand 103. Extending horizontally from the body connector 102 in an elliptical shape is body loop 110, which is rigidly attached to and coplanar with vertical stand 103. Wire frame 100 can be made from a single piece of No. 9 galvanized wire approximately seven feet in length.

Figure 4:
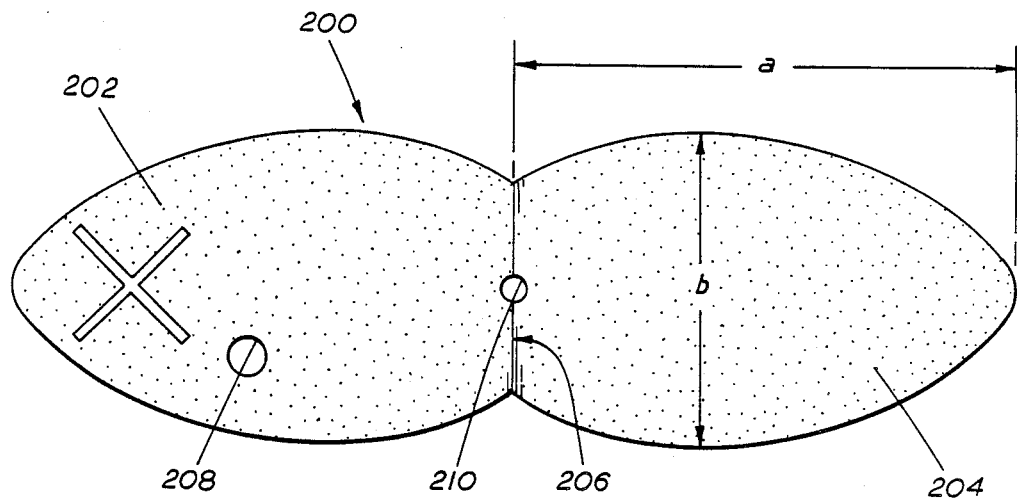
FIG. 4 is a plan view of the body envelope of the present invention prior to folding.

As seen in FIG. 4, body envelope 200 is cut from a single piece of quarter inch thick white closed cell polyethylene foam. The shape of the envelope as cut flat is that of two ellipses 202 and 204 joined at a common end along fold line 206. Connector hole 210 is cut or burned at the center of fold line 206, and air displacement hole 208 is cut or burned approximately half way between the center of one ellipse 202 and its perimeter. An additional hole for air displacement can be formed in ellipse 204.

Figure 5:
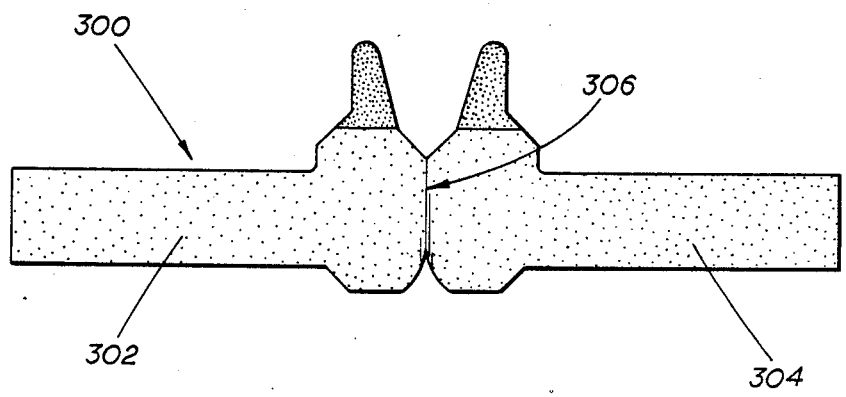
FIG. 5 is a plan view of the head of the present invention prior to folding.

As seen in FIG. 5, head 300 is also cut from a single piece of quarter inch thick white closed cell polyethylene foam. The beak can be of pink foam, if desired, and attached to the head 300.

Assembly and use of the decoy will now be described. Starting with a seven foot length of No. 9 galvanized wire, wire frame 100 is fashioned. Body loop 110 is shaped approximately midway of the stand 103, and twisted relative to stand 103, forming body connector 102 of twisted wire, leaving body loop 110 coplanar with vertical stand 103. This will generally yield a frame 38 inches tall. The body loop will be approximately 22 inches along its major axis a and 3½ inches along its minor axis b. These dimensions, of course, can be varied as desired.

To make body envelope 200, a quarter inch thick piece of closed cell polyethylene foam is cut into the shape of two ellipses 202 and 204, with a common boundary at fold line 206. Connector hole 210 and finger hole 208 are cut as described before, and if desired, an X-shape can be painted on upper body ellipse 202 to resemble a goose's wings when folded.

Wire stand 103 is then folded as required at body connector 102 to be inserted through connector hole 210 until body loop 110 comes up against fold line 206. Wire stand 103 is then straightened out as before. Storage loop 103 is formed in the wire immediately above body connector 102, and head loop 106 is formed at the top. Finally, stabilizer bend 104 can be formed near the lower end 101 of stand 103.

Body envelope 200 is then folded along fold line 206, and all of the edges of body envelope 200 are matched and melted or glued together surrounding body loop 110. This yields a body envelope approximately 24 inches along its major axis a and 17 inches along its minor axis b. Body envelope 200 is not glued to body loop 110 but is left to rotate freely thereon about its major axis a.

Head 300 is cut from foam as described before, with two matching halves 302 and 304, and a fold line 306 therebetween. Halves 302 and 304 are folded together along fold line 306, enveloping head loop 106, and the edges are glued together. If a different color beak is used, it can be glued to head 300.

In order to use decoy A, wire frame 100 is held in one hand, and body envelope 200 is grasped with the other hand. A finger can be inserted into air displacement hole 208 to partially open the space between ellipses 202 and 204, to allow rotation of body envelope 200 about body loop 110. Body envelope 200 is then rotated perpendicular to body loop 110 and stand 103. This causes ellipses 202 and 204 to be separated at the middle while joined continuously around the edges. This, combined with the blunt configuration along fold line 206, gives a realistic image of a three dimensional goose body. As the body envelope 200 opens up, air can enter air displacement hole 208 if necessary to avoid the formation of a vacuum.

This embodiment is described for purposes of illustration. Various modifications can be made, such as substitution of materials, without departing from the innovative features described herein. To the extent that such modifications are equivalent, it is intended that they be encompassed in the following claims.

I claim:

1. A decoy apparatus resembling a goose, comprising:
   a vertical stand;
   a body loop rigidly attached to and extending in an ellipse from the stand, having its major axis horizontal and its minor axis vertical;
   an expandable two-ply resilient body envelope in the shape of a goose body rotatably enveloping the body loop; and
   wherein said body envelope can be selectively expanded to resemble a goose body by rotating the body envelope approximately perpendicular to the body loop, and the body envelope can be selectively flattened for storage by rotating the body envelope approximately coplanar with the body loop.

2. The decoy apparatus of claim 1, further comprising:
   a head loop extending from the stand; and
   a shaped member attached to the head loop, to simulate the head of a bird.

3. The decoy apparatus of claim 1, further comprising a storage loop extending from the stand for storage and carrying purposes.

4. The decoy apparatus of claim 1, further comprising a bend near the lower end of the stand to prevent the stand from turning when installed in the ground.

5. The decoy apparatus of claim 1, further comprising a finger hole in the body for insertion of a finger to assist in rotating the body relative to the body loop.

6. The decoy apparatus of claim 1, wherein the body is constructed of resilient material sufficiently stiff to hold its desired shape when expanded by rotation perpendicular to the body loop.

7. The decoy apparatus of claim 1, wherein the resilient material is closed cell polyethylene foam.

8. A decoy apparatus resembling a goose, comprising:
   a vertical stand;
   a head loop extending from the stand;
   a body loop rigidly attached to and extending in an ellipse from the stand, having its major axis horizontal and its minor axis vertical;
   an expandable two-ply resilient body envelope in the shape of a goose body rotatably enveloping the body loop; and
   a head member in the shape of a goose head attached to the head loop;
   wherein said body envelope can be selectively expanded to resemble a goose body by rotating the body envelope approximately perpendicular to the body loop, and the body envelope can be selectively flattened for storage by rotating the body envelope approximately coplanar with the body loop.

9. A method of assembling a goose decoy, comprising the steps of:
   bending a length of wire to form a vertical stand having a head loop extending substantially vertically therefrom and having an elliptical body loop coplanar with the stand and rigidly extending substantially horizontally therefrom;
   attaching a simulated goose head to the head loop;
   cutting a body envelope from a closed cell foam in the shape of two ellipses joined at an end of each ellipse;
   folding the body envelope into the shape of an ellipse by folding at the joint between the two ellipses;
   enveloping the body loop with the body envelope;

joining together matching edges of the two ellipses to form a completely closed body envelope free to rotate on the body loop;

selectively rotating the body envelope to be coplanar with the body loop for storage; and selectively rotating the body envelope to be perpendicular to the body loop for simulation of a goose.

10. The method of claim 9, further comprising the step of bending the vertical stand near a lower end thereof to prevent the decoy from turning after the stand is inserted into the ground.

11. The method of claim 9, further comprising the step of bending a storage loop in the vertical stand to provide a means for hanging the decoy.

12. The method of claim 9, further comprising the step of cutting a hole in the body envelope for insertion of a finger to assist in rotating the body envelope relative to the body loop.

* * * * *